United States Patent [19]
Norstedt et al.

[11] Patent Number: 5,926,469
[45] Date of Patent: Jul. 20, 1999

[54] CHANNEL RESOURCE MANAGEMENT WITHIN A DIGITAL MOBILE COMMUNICATIONS NETWORK

[75] Inventors: Bengt Norstedt, Djursholm; Magnus Wester, Sundbyberg; Roland Bodin, Spånga, all of Sweden

[73] Assignee: Telefonaktiebolaget L/M Ericssoon (publ), Stockholm, Sweden

[21] Appl. No.: 08/747,201

[22] Filed: Nov. 12, 1996

Related U.S. Application Data

[51] Int. Cl.$^6$ .................................................. H04J 3/16
[52] U.S. Cl. ..................... 370/329; 370/465; 370/477; 455/439
[58] Field of Search .................... 370/310, 329, 370/330, 370, 377, 385, 458, 460; 455/422, 428, 436, 439, 465, 477

[56] References Cited

U.S. PATENT DOCUMENTS

| | | | |
|---|---|---|---|
| 4,750,171 | 6/1988 | Kedar et al. | 370/458 |
| 4,935,925 | 6/1990 | Williams et al. | 370/466 |
| 5,159,702 | 10/1992 | Aratake | 455/33.1 |
| 5,781,538 | 7/1998 | Ganesan et al. | 370/310 |

FOREIGN PATENT DOCUMENTS

| | | |
|---|---|---|
| WO 93/06684 | 4/1993 | WIPO . |
| WO 95/33347 | 12/1995 | WIPO . |

*Primary Examiner*—Douglas W. Olms
*Assistant Examiner*—Shick Hom
*Attorney, Agent, or Firm*—Jenkens & Gilchrist, P.C.

[57] ABSTRACT

A disconnect time in accordance with the Global System for Mobile (GSM) Phase 1 standard is reduced within a particular base station controller (BSC) serving a particular mobile station. In response to a Layer 2 Disconnect message from a first mobile station and after the expiration of the reduced disconnect timer, the serving BTS releases the indicated logical channel from the first mobile station and enables the connected base station control (BSC) to more efficiently allocate the released logical channel (SDCCH or TCH) to a second mobile station. Thereafter, additional Layer 2 Disconnect messages transmitted by the first mobile station are ignored and no acknowledging Disconnect Mode (DM) message is transmitted over the indicated logical channel. Thus, collision over the same logical channel between the first and second mobile stations is avoided and the second mobile station is able to communicate over the allocated logical channel.

44 Claims, 6 Drawing Sheets

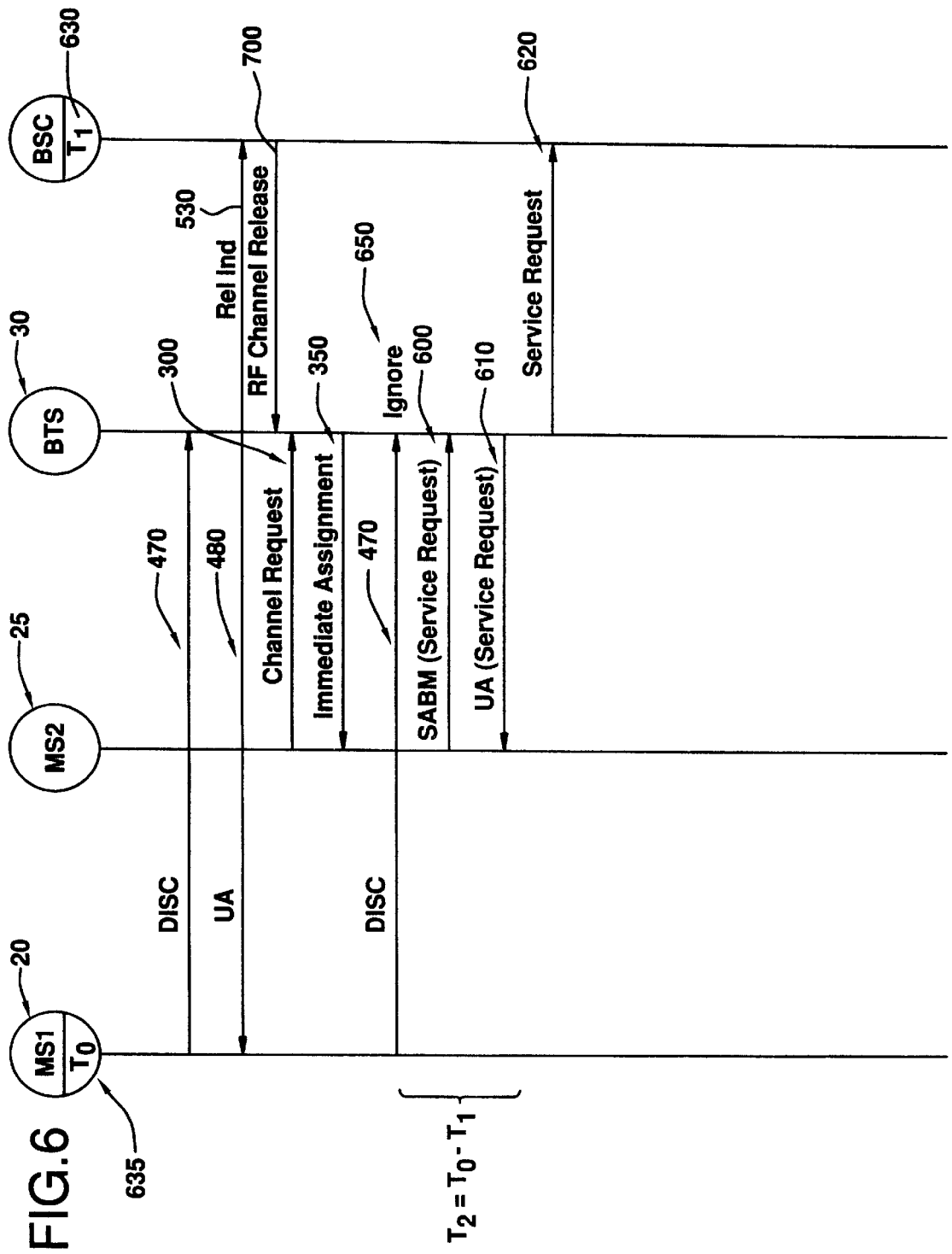

CHANNEL RESOURCE MANAGEMENT WITHIN A DIGITAL MOBILE COMMUNICATIONS NETWORK

BACKGROUND OF THE INVENTION

1. Technical Field of the Invention

The present invention relates to a telecommunications network and, in particular, to the efficient management of channel resources within a digital mobile communications network.

2. Description of Related Art

The general name of the connection between a particular mobile station traveling within a particular cell area and the base transceiver station (BTS) providing radio coverage for that particular cell area is the "radio interface" or "air interface". Historically, the communications of information across the air interface between a base transceiver station (BTS) and a mobile station has employed, so-called, analog modulation techniques. For example, Frequency Division Multiple Access (FDMA) technology has been widely utilized to assign each mobile station to one of a plurality of the frequency channels associated with the current cell area to communicate with the serving BTS. More recently, however, digital modulation techniques have been used in order to enhance the spectrum efficiency with which the bandwidth allotted to mobile communications is used. As an illustration, the two techniques of time division multiple access (TDMA) and code division multiple access (CDMA) have been utilized to allow communications to proceed between a BTS and a plurality of different mobile stations on a relatively limited amount of radio frequency bandwidth. The Global System for Mobile (GSM) communications system, for example, utilizes the TDMA concept with one TDMA frame per carrier frequency channel to communicate between a mobile station and a BTS. One frame consists of eight time-slots (TS). Each time-slot of a TDMA frame on a single frequency channel is referred to as a physical channel. Accordingly, there are eight physical channels per carrier in the GSM system. Each physical channel of the GSM system can be compared with one single channel in an FDMA-system, where every user is connected to the system via one of the associated frequencies.

The utilization of TDMA technology requires that a great quantity and variety of information must be transmitted between the serving BTS and the mobile station over the limited physical channels. For example, control data, service request data, actual traffic data, supplementary data, etc., have to be communicated over the physical channels. As a result, in order to distinguish one type of data from another, different logical channels have been named and mapped (assigned) on to the available physical channels. For example, actual speech is sent on the logical channel named "traffic channel (TCH)" occupying one or more physical channels. Paging of a called party mobile station is performed over the logical "paging channel (PCH)". Furthermore, synchronization of a mobile station with a serving BTS is performed over the logical "synchronization channel (SCH)" which occupies one part of the physical channels. Accordingly, depending on the type of information being transmitted, different logical channels are utilized. Needless to say, if more physical channels are assigned to a particular logical channel, a lesser number of physical channels are available for the rest of the logical channels.

Because of the limited physical channel resources, mobile service providers are often faced with channel resource management and dimensioning problems. Because of the fact that congestion in SDCCH and/or TCH logical channels results in lost calls and unsuccessful call setups, the efficient management of the SDCCH and/or TCH is critical for providing reliable mobile service to mobile stations traveling within a serving coverage area.

One of the ways to better utilize channel resources is for the serving base transceiver station (BTS) to efficiently and effectively release no-longer needed logical channels. As an illustration, whenever a particular mobile station attempts to release a seized logical channel (e.g., TCH and/or SDCCH), a request signal instructing the serving BTS to release the logical channel is transmitted by the mobile station. Upon receiving the request signal, the serving BTS transmits an acknowledgment signal back to the requesting mobile station confirming the release. The mobile station then stops communicating over the released channel and the logical channel should become available for other mobile stations. However, due to radio interference and other terrestrial hindrances, the requesting mobile station sometimes fails to receive the transmitted acknowledgment signal. Not knowing whether the first release request was ever received by the serving BTS, the mobile station then re-attempts to release the channel by transmitting another release request signal to the serving BTS over the same logical channel. The mobile station repeats the above re-transmission until the expected acknowledgment signal is received or a prescribed time period has elapsed. Within the GSM phase 1 standard, in case no acknowledgment signal is received from the serving BTS, mobile stations are programmed to re-transmit a release request signal up to five times with a 235 ms interval. As a result, in the worst case, the mobile station repeatedly transmits five Disconnect signals over the same logical channel for a total of 1,175 ms (235×5) after determining that it no longer needs the channel.

Similarly, the serving BTS and/or BSC also has no way of determining whether the transmitted acknowledgment signal has been received by the requesting mobile station. The serving BTS, therefore, also does not know whether any additional Disconnect signals will be received over the same SDCCH from the requesting mobile station. As a result, even after properly receiving the first release request from the mobile station, the serving BTS and BSC must delay the release of the logical channel for possible re-transmission of the Disconnect signals by the unacknowledged mobile station for the 1,175 ms delay period.

Delay of 1,175 ms for each and every release of SDCCH and a corresponding time delay for TCH are inefficient and wasteful management of valuable logical channel resources. Accordingly, there is a need for a mechanism to minimize the channel release delay within a serving BTS.

SUMMARY OF THE INVENTION

The present invention discloses a method and apparatus for releasing a logical channel within a mobile telecommunications network. A normal disconnect timer T1 as specified by the Global System for Mobile (GSM) communications standard is reduced to a lesser value of T2 at a base station controller (BSC) serving a particular mobile station. When that mobile station transmits a GSM based Layer 2 Disconnect signal to release the seized logical channel, the serving base transceiver station (BTS) acknowledges the Disconnect signal by transmitting an acknowledgment signal. Thereafter, the indicated logical channel is released by the serving BSC after the T2 timer expires. The released channel is then allocated to another mobile station requesting mobile service within the same BSC coverage area.

Thereafter, if the mobile station fails to receive the transmitted acknowledgment signal, in accordance with the GSM standard, another layer 2 Disconnect signal is received by the serving BTS. In accordance with the teachings of the present invention, the newly received Disconnect signal is ignored and no additional acknowledgment signal is transmitted by the serving BTS. In one embodiment, the serving BTS ignores any subsequent Disconnect signal unless a layer three (3) signal is first received from a mobile station.

BRIEF DESCRIPTION OF THE DRAWINGS

A more complete understanding of the method and apparatus of the present invention may be had by reference to the following detailed description when taken in conjunction with the accompanying drawings wherein:

FIG. 6 is a signal sequence diagram illustrating the serving BTS ignoring subsequent Disconnect signals in accordance with the teachings of the present invention.

DETAILED DESCRIPTION OF THE DRAWINGS

Figure 1:
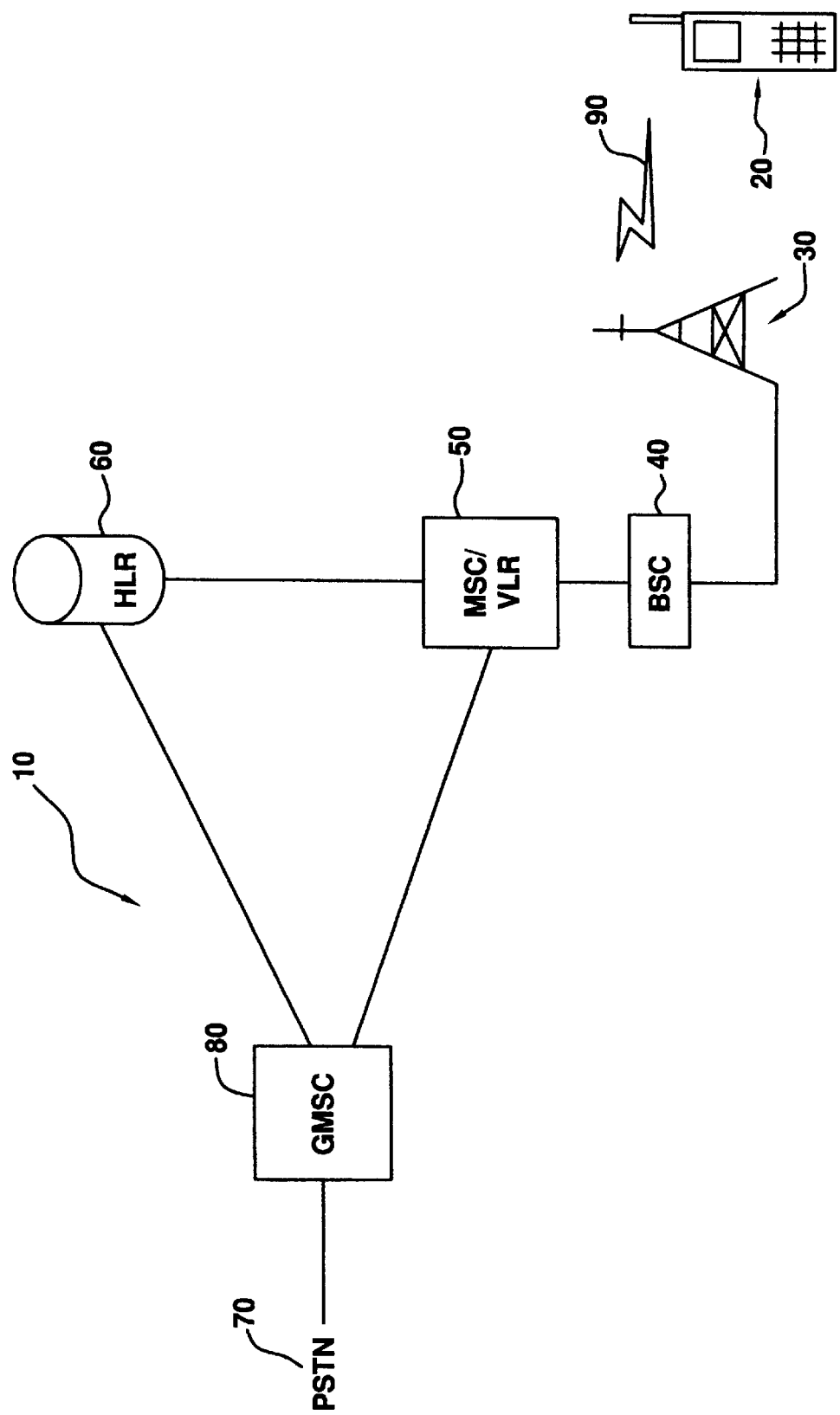
FIG. 1 is a block diagram of a mobile telecommunications network illustrating a mobile station communicating with a serving base transceiver station (BTS)

FIG. 1 is a block diagram of a Public Land Mobile Network (PLMN) 10 illustrating a mobile station 20 communicating with a serving base transceiver station (BTS) 30. A geographic area associated with a particular Public Land Mobile Network (PLMN) 10 is partitioned into a number of smaller areas. Whenever a mobile station 20 travels into one of those smaller areas known as a "location area", a base station controller (BSC) 40 serving that particular location area detects the traveling mobile stations 20 and informs the associated mobile switching center/visitor location register (MSC/VLR) 50 of the mobile station's presence. In case the mobile station 20 is an unregistered subscriber, a home location register (HLR) 60 associated with the newly registering mobile station 20 is identified and necessary communication is facilitated between the serving MSC/VLR 50 and the HLR 60 to authenticate the new mobile station 20. Requisite subscriber information related to the newly registering mobile station 20 is further requested and retrieved from the associated HLR 60 and stored at the serving MSC/VLR 50. Thereafter, the mobile station 20 is allowed to access mobile service within the serving MSC/VLR 50 coverage area.

Whenever an incoming call connection is requested towards the mobile station 20, a call setup signal, such as an Integrated Service Digital Network User Part (ISUP) based Initial Address Message (IAM) is received by a gateway mobile switching center (GMSC) 80 associated with the HLR 60. After performing HLR interrogation to ascertain the current location of the mobile station 20, the received incoming call setup signal is rerouted by the GMSC 80 to the MSC/VLR 50 currently serving the mobile station 20. The MSC/VLR 50 then determines the current location area of the mobile station 20 and instructs the appropriate base station controller (BSC) 40 to page the mobile station 20. The BTS 30 then pages the mobile station over a paging channel (PCH) to alert the mobile station of an incoming call. As soon as the mobile station detects the paging message, the mobile station 20 sends a request for a signaling channel over a Random Access Channel (RACH) to the BSC 40. After allocating an idle Stand-alone Dedicated Control Channel (SDCCH) to the mobile station 20, the BSC 40 sends a message instructing the mobile station 20 to switch to that particular SDCCH. After communicating necessary control and service related data over the newly allocated SDCCH channel, a traffic channel (TCH) is subsequently seized and a call connection between the mobile station 20 and the BSC 40 is established via the BTS 30.

Initially, the communication interface 90 between the serving BTS 30 and the mobile station 20 employed so called analog modulation techniques. However, with the recent developments of digital communication technology, digital modulation techniques are being used to enhance the efficiency and capacity of data communications within a mobile telecommunications network. As an illustration, the techniques of time division multiple access (TDMA) or code division multiple access (CDMA) are being used to allow multiple communications to proceed on a relatively limited amount of radio frequencies. Global System for Mobile (GSM) based telecommunications networks, for example, utilize the TDMA technology with one TDMA frame per carrier frequency to communicate between a mobile station and a BTS.

Figure 2:
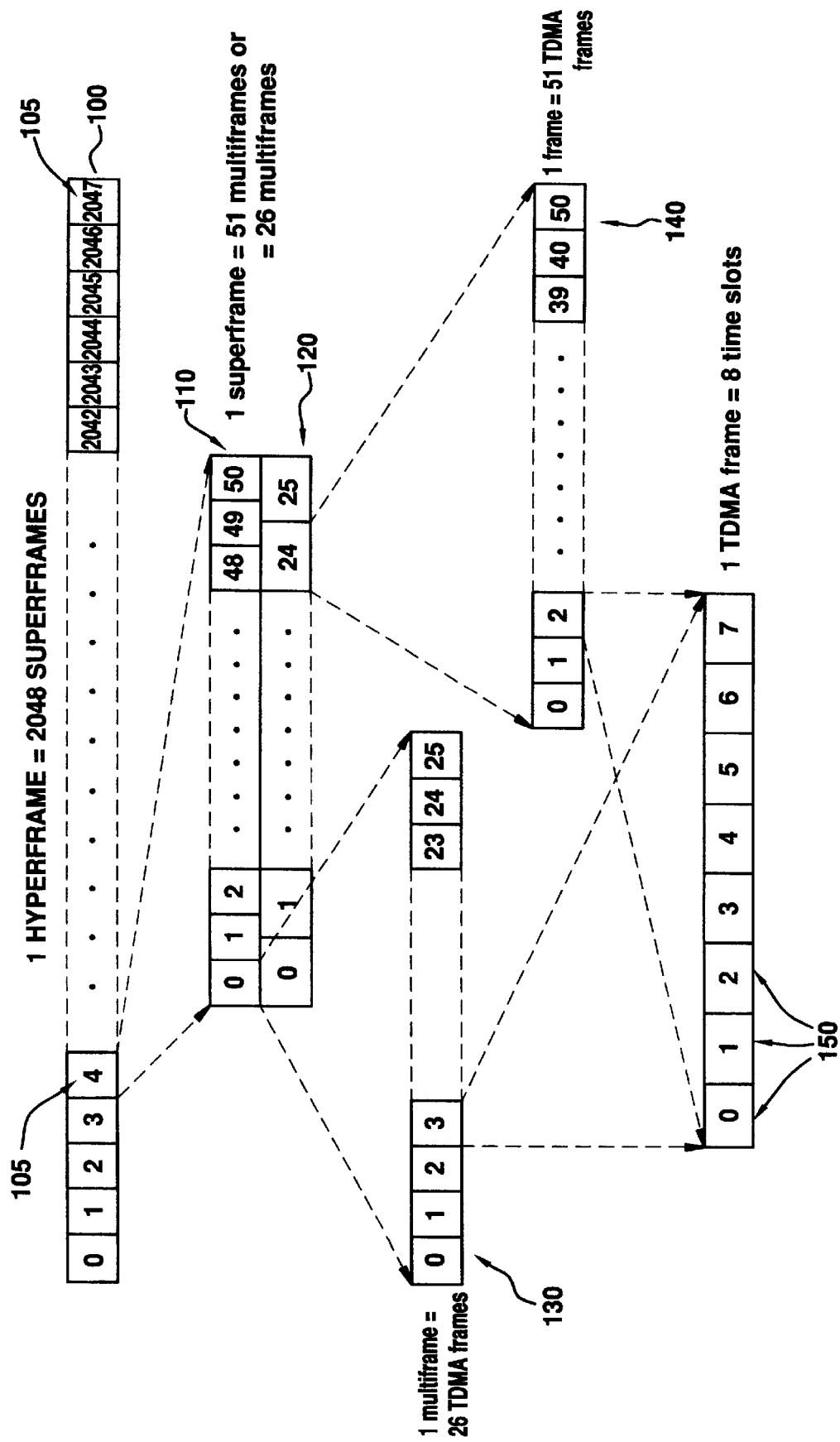
FIG. 2 is a block diagram of physical channels in accordance with Time Division Multiple Access (TDMA) technology.

Reference is now made to FIG. 2 depicting a diagrammatic representation of time-frame structures within the GSM standard. The longest recurrent time period of the structure is called a hyperframe 100 and has the duration of 3 hours 28 minutes 53 seconds 760 ms. One hyperframe 100 is divided into 2048 superframes 105, each having a duration of 6.12 seconds. The superframe 105 is itself sub-divided into a number of multiframes. Two types of multiframes exist in the GSM standard. First, there is a fifty-one (51) frame multiframe 110 with a duration of 120 ms, comprising twenty-six (26) TDMA frames 130. Next, there is a twenty-six (26) frame multiframe 120 with a duration 235.4 ms, comprising fifty-one (51) TDMA frames 140. Lastly, each TDMA frame within a multiframe has eight time slots 150. Each of these eight physical time slots is equivalent to one Frequency Division Multiple Access (TMDA) channel serving a single mobile station.

A great quantity and variety of information must be transferred between the BTS and the mobile station. For example, paging to inform the mobile station of an incoming call has to be performed over one of the time slots. A request for mobile service further needs to be communicated over one of the time slots. Furthermore, the actual voice data must be communicated over the available time slots. Therefore, in order to distinguish one type of information over another, different logical channels have been introduced and assigned to each of the eight physical time slots.

Figure 3:
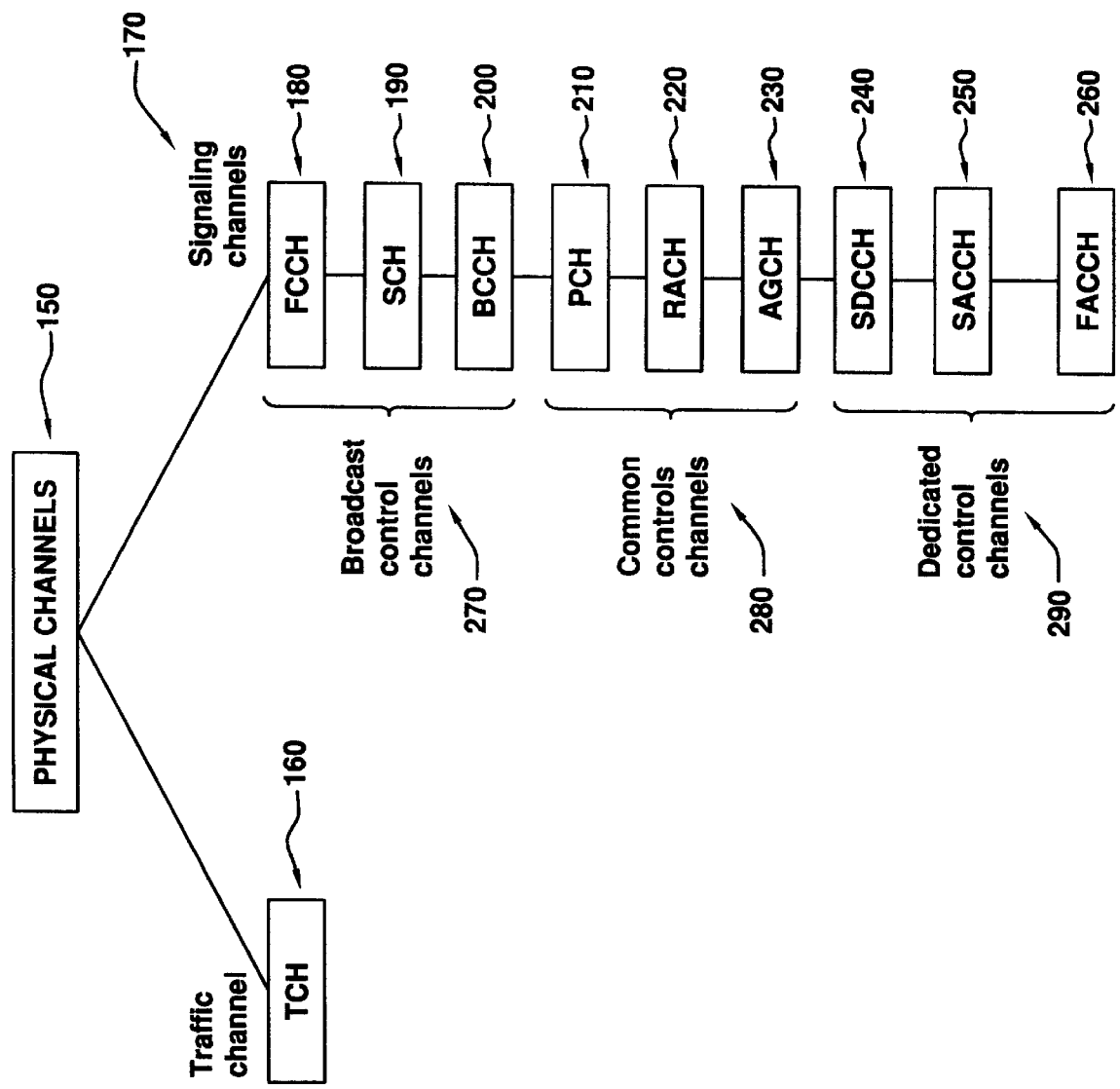
FIG. 3 is a block diagram of different logical channels within a TDMA physical frame in accordance with the Global System for Mobile (GSM) standard.

Reference is now made to FIG. 3 illustrating different logical channels within the GSM standard which can be separated into two broad categories: traffic channels (TCH) 160 and signaling channels 170. Traffic channels (TCH) 169 are utilized by the serving BSC to communicate call data (e.g., voice data) with a particular mobile station traveling within its coverage area. On the other hand, signaling channels 170 are utilized by the serving BSC and BTS to communicate other control data necessary to implement the communication of call data with the mobile station.

Signaling channels are further subdivided into three categories: broadcast control channels 270, common control channels 280, and dedicated control channels 280. Each of the above three categories are then still further sub-divided into a number of logical channels for transporting different types of information between the serving BTS and the mobile station.

Broadcast control channels 270 are mainly utilized for communicating information from the serving BTS to a particular mobile station traveling within its coverage area (down-link) and include the Frequency Correction Channel (FCCH) 180, Synchronization Channel (SCH) 190, and Broadcast Control Channel (BCCH) 200. The Frequency Correction Channel (FCCH) 180 carries information for frequency correction of the mobile station. The Synchronization Channel (SCH) 190 carries information for frame synchronization of the mobile station and identification of the BTS. Lastly, the Broadcast Control Channel (BCCH) 200 is used to broadcast general system information about the cell to all mobile stations located within its location area. For example, the broadcast system information includes data about the network that the mobile station needs to be able to communicate with the network in an appropriate manner. Such information includes cell description, location area identity, neighbor cell description, etc.

Common control channels 280 include the Paging Channel (PCH) 210, Random Access Channel (RACH) 220, and Access Grant Channel (AGCH) 230. The Paging Channel (PCH) 210 is used on the downlink to page a mobile station. For example, when an incoming call setup request is received by the serving MSC/VLR, the appropriate BSC currently serving the mobile station is instructed to page the specified mobile station over a PCH. The Random Access Channel (RACH) 220, on the other hand, is used by the mobile station to request allocation of a Stand-alone Dedicated Control Channel (SDCCH) 240 to the BSC. For example, upon detecting the paging message informing the mobile station of an incoming call, the called party mobile station requests a SDCCH from the serving BSC over a RACH. After allocating an idle SDCCH, the BSC utilizes an Access Grant Channel (AGCH) 230 to communicate the identity of the allocated SDCCH to the requesting mobile station.

Dedicated control channels 290 include the Stand-alone Dedicated Control Channel (SDCCH) 240, Slow Associated Control Channel (SACCH) 250, and the Fast Associated Control Channel (FACCH) 260. The Stand-alone Dedicated Control Channel (SDCCH) 240 is used for signaling with a dedicated mobile station. Accordingly, the SDCCCH 240 is the channel used for performing location update procedures whenever a mobile station enters a new location area. The SDCCH is also utilized to initiate a call setup and to seize a TCH. The Slow Associated Control Channel (SACCH) 250 is associated with a TCH 160 or an SDCCH 240. The SACCH 250 is a continuous data channel carrying continuous control information, such as measurement reports, timing advance and power order, between the serving BSC and the mobile station. Lastly, the Fast Associated Control Channel (FACCH) 260 is associated with a particular TCH to work in burst stealing mode to replace speech or data traffic with other necessary signaling.

As illustrated above, with nine different types of logical signaling channels and one logical traffic channel occupying the limited physical channels, the eight time slots within a TDMA frame need to be managed efficiently and effectively to provide reliable mobile service to mobile stations traveling within a particular BSC coverage area. Since logical channel assignments to physical channels can not be changed dynamically as demands for each logical channel changes within a serving network, determining the appropriate number of physical time slots to be assigned to each of the logical channels is crucial. Especially since congestion in the two of the most frequently utilized logical channels (SDCCH and TCH) results in failed call connection and lost calls. Even after allocating an appropriate number of physical channels to each logical channel, efficient management of channel resources is further necessary to maximize the potential utilization of available logical channels.

Figure 4:
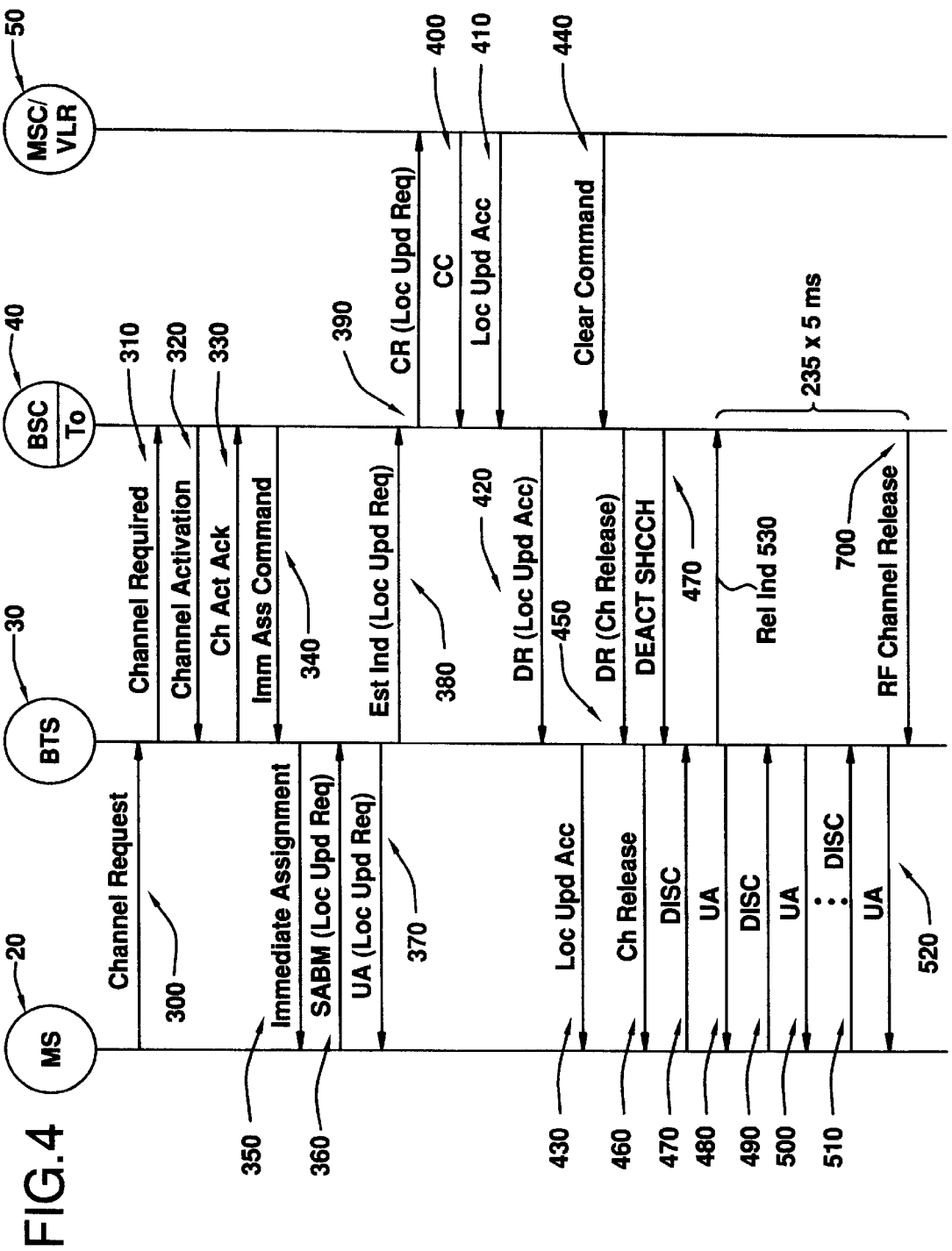
FIG. 4 is a signal sequence diagram illustrating a normal channel release procedure in accordance with the GSM phase 1 standard.

FIG. 4 is a signal sequence diagram illustrating a normal channel release procedure in accordance with the GSM Phase 1 standard. Whenever a mobile station 20 travels into a new location area, the moving mobile station 20 performs a location update to inform the current location of the mobile station 20 to the serving MSC/VLR 50 and to the associated HLR (not shown in FIG. 4). The mobile station (MS) 20 initiates the location update process by transmitting a channel request message 300 towards the serving BTS over a Random Access Channel (RACH). The serving BTS 30 then transmits a Channel Required message 310 to the connected BSC 40. If a SDCCH is available, the BSC 40 transmits a Channel Activation message 320 back to the serving BTS 30. The BTS 30 then acknowledges the channel activation by returning a Channel Activation Acknowledge message 330 to the connected BSC 40. The BSC 40 then transmits an Immediate Assignment Command message 340 to the serving BTS 30 instructing the BTS 30 to assign the allocated SDCCH to the requesting mobile station 20. The serving BTS 30 then transmits an Immediate Assignment message 350 to the requesting mobile station 20 instructing the mobile station 20 to switch to the assigned SDCCH. After receiving the Immediate Assignment message 350, the mobile station 20 switches to the ordered SDCCH and establishes a main signaling link by sending a Set Asynchronous Balanced Mode (SABM) message 360 back to the serving BTS 30. The transmitted SABM message 360 includes a "Location Updating Request" message and requests the serving MSC/VLR 50 to perform a location update. The "Location Updating Request" message transmitted over the assigned SDCCH contains, for example, the type of location updating, the ciphering key sequence number, the old location area identity stored in the mobile station, the type of mobile station, and the mobile subscriber identity. When the transmitted SABM message is received by the serving BTS 30, the Location Updating Request is looped back to the mobile station 20 in an Unnumbered Acknowledgment (UA) frame 370. The serving BTS then transmits an Established Indication Message 380 including the "Location Updating Request" to the connected BSC 40. The Established Indication Message 380 informs the connected BSC 40 that a communications has been established and a request for a location update procedure has been initiated by the mobile station 20. The BSC 40 then establishes a Signaling Connection and Control Part (SCCP) connection to the serving MSC/VLR 50 by sending a SCCP based Connection Request message 390 with the "Location Update Request" included in the information field. This "Location Updating Request" message is somewhat modified, as the BSC adds the new location area identity indicating where the mobile station 20 is currently located.

The modified message is called "complete Layer 3 information" or "Initial MS" message. The serving MSC/VLR 50 then acknowledges the message by sending a Connection Confirmed (CC) frame 400 back to the BSC 40. If the MSC/VLR 50 accepts the location updating from the mobile station 20, the MSC/VLR 50 sends a Location Updating Accepted message 410 towards the mobile station 20. Accordingly, the Location Updating Accepted (Loc Upd Acc) message is further communicated from the connected BSC 40 to the serving BTS using a Data Request (DR) frame 420. The serving BTS 30 then transmits a Location Update Accepted message 430 over the allocated SDCCH towards the mobile station 20. Upon successful location updating of the mobile station 20, the network initiates the channel release by sending a Clear Command (CC) message 400 to the BSC 40. The BSC 40 then sends the Channel Release message transparently through the serving BTS 30 towards the mobile station 20 (signals 420 and 430). The BSC 40 then sends a Deactivate SACCH message 470 to the BTS 30 instructing the base station to stop sending messages over the Slow Associated Control Channel (SACCH). When the mobile station 20 receives the Channel Release message 460, the mobile station 20 sends a layer 2 Disconnect message 470 towards the BTS to release the seized SDCCH. The Disconnect message 470 is acknowledged by the serving BTS 30 back to the disconnecting mobile station 20 with a UA frame 480. The serving BTS 30 further transmits a Release Indication message 530 to inform the connected BSC 40 of the received disconnect request message. After receiving the transmitted UA frame 480 by the mobile station 20, the mobile station 20 ceases to communicate over the identified SDCCH.

Due to radio interference and other terrestrial hindrances, sometimes the transmitted UA frame 480 acknowledging the receipt of the Disconnect message 470 is not received by the disconnecting mobile station 20. The mobile station 20 then has no way of determining whether the serving BTS has properly received the transmitted Disconnect message 470. As a result, in order to ensure that the seized logical channel is properly released, the GSM Phase 1 standard mandates the mobile station 20 to repeatedly re-transmit the Disconnect message 470 every 235 ms up to five times or until an acknowledging UA message is received. As an illustration, the mobile station 20 transmits a first Disconnect message 470 towards the serving BTS 30. The serving BTS 30 properly receives the Disconnect message 470 and acknowledges by transmitting a UA message 480 back to the mobile station 20. Furthermore, the serving BTS 30 transmits a release request signal, such as Release indication (Rel Ind) 530, to inform the connected BSC 40 of the received Disconnect message 470. If the mobile station fails to receive the transmitted UA message 480, after 235 ms, the mobile station re-transmits another Disconnect message 490 towards the serving BTS. In a manner similar to the failure of the delivery of the UA message to the mobile station 20, Disconnect signals transmitted by the mobile station 20 may also fail to reach the serving BTS 30. However, if the Disconnect signal is received by the serving BTS 30, the BTS 30 again acknowledges by transmitting a second UA message 500. Such sequences may be repeated five times before the indicated SDCCH is finally released by the mobile station.

The serving BSC 40 is associated with a T0 timer 710. After receiving the Release Indication (Rel Ind) signal 530 from the serving BTS 30, the BSC 40 awaits until the T0 timer expires before instructing the serving BTS 30 to release the indicated logical channel. In accordance with the GSM specification, the T0 timer 710 associated with the SDCCH logical channel is also set to 1175 ms. This is because, the serving BSC 40 and/or BTS 30 has no means to determine whether the transmitted UA message 480 has been received by the mobile station 20 and has to wait for potential Disconnect messages. Accordingly, only after the expiration of the 1175 ms after receiving the first Disconnect message 470, the serving BSC 40 sends a channel release message, such as a Radio Frequency (RF) Channel Release signal 700, to instruct the BTS 30 to release the specified logical channel.

It is to be understood that the disconnect procedures illustrated above using the SDCCH is for exemplary purposes only and that the disconnection procedure for releasing a TCH is also applicable in the sense that the serving BSC also needs to wait a corresponding time period before actually releasing the TCH.

Such an inefficient and wasteful delay in releasing valuable channel resources is highly undesirable. However, without modifying all existing mobile stations to perform differently for the above Disconnect procedure, there is currently no mechanism to release SDCCHs and/or TCHs more efficiently. Requiring every GSM phase 1 mobile stations to be physically modified to perform differently is an impractical solution. On the other hand, modifying the serving BSC to release the logical channel earlier than the associated mobile station also creates undesirable collision problems.

Figure 5:
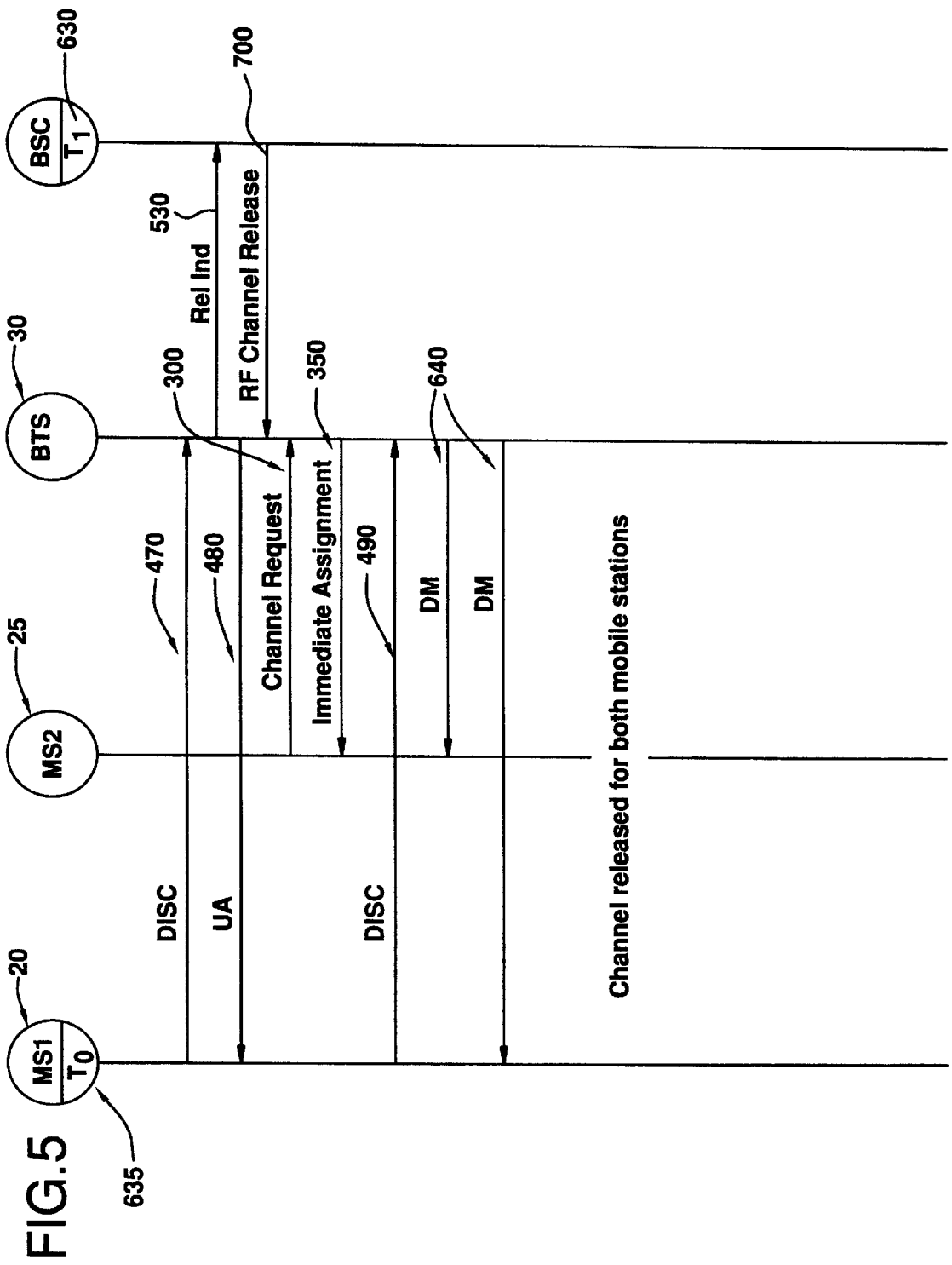
FIG. 5 is a signal sequence diagram illustrating the collision between two mobile stations if a logical channel is released earlier by the serving BTS than the requesting mobile station.

Reference is now made to FIG. 5 illustrating the collision of two mobile stations while attempting to communicate concurrently over the same SDCCH. If all GSM Phase 1 mobile stations are left unchanged to re-transmit Disconnect signals as illustrated above while the serving BSC 40 releases the indicated SDCCH or TCH without waiting for the full 1175 ms time out, the following illustrated collision may occur over the same SDCCH. A first mobile station 20 currently associated with a particular SDCCH transmits a Disconnect message 470 towards the serving BTS 30 to release the logical channel. The first mobile station 20 is associated with a T0 timer (1175 ms) 635 instructing the mobile station 20 to repeatedly transmit a Disconnect signal every 235 ms until the T0 timer expires or an acknowledgment signal is received from the serving BTS.

On the other hand, a corresponding T1 timer 630 within the serving BSC 40 has been reduced to a lesser value than the T0 timer 635. Accordingly, the BSC 40 sends the RF Channel Release message 700 to the connected BTS 30 sooner than as prescribed by the GSM phase 1 standard. Because the reduced T1 timer 630 has already expired and the RF channel Release message 700 has already been received by the BTS 30, the BTS 30 considers the specified logical channel to have been released and therefore idle. Subsequently, a second mobile station 25 requests mobile service by transmitting a Channel Request 300 towards the serving BTS 30. The serving BTS 30 informs the BSC 40, which in turn, is now able to allocate the SDCCH that has just been released by the first mobile station 20 to the requesting second mobile station 25. An Immediate Assignment message 350 is transmitted from the serving BTS to the second mobile station 25 instructing the second mobile station 25 to communicate over that particular SDCCH. Consequently, that particular SDCCH is seized by the second mobile station 25.

However, the UA message 480 transmitted by the serving BTS 30 acknowledging the disconnect request fails to reach the first mobile station 20. Since the associated T0 timer 635 has not yet expired, the first mobile station 20 transmits another Disconnect signal 470 towards the serving BTS 30 over the same SDCCH. Because the transmitted Disconnect signal 470 is a layer 2 signal, the serving BTS 30 has no way of determining that the first mobile station is transmitting the unwanted Disconnect signal while the same SDCCH has already been assigned to the second mobile station. In accordance with the GSM standard, the serving BTS 30 then transmits a Disconnect Mode (Dm) message 640 over the SDCCH instructing the mobile station(s) to discontinue usage of the associated SDCCH. The first and second mobile stations, which are both tuned to the same SDCCH, receive the Dm signal 640 and release the channel. As a result, a call setup connection being established by the second mobile station 25 is also dropped and the indicated SDCCH is released by both mobile stations.

FIG. 6 is a signal sequence diagram illustrating the serving BTS 30 ignoring subsequent Disconnect signals received over a SDCCH logical channel that has already been allocated to another mobile station. In accordance with the teachings of the present invention, the T1 timer 630 associated with the serving BSC 40 is reduced to a lesser value than the T0 timer 635 associated with the disconnecting first mobile station 20. One way of reducing the T1 timer 630 value is to decrement the value in the interval of 235 ms. Accordingly, the T1 timer 630 can be decreased from 1175 ms as mandated by the GSM standard to any one of the 940 ms, 705 ms, 470 ms, 235 ms, or 0 ms. Since changing the T0 timer 635 associated with every GSM phase 1 mobile station is impractical, the T0 timer value of 1175 ms remains unchanged.

The first mobile station 20 transmits a Layer 2 Disconnect signal 470 towards the serving BTS 30 over a designated logical channel, such as a SDCCH or TCH, to inform the serving BTS 30 that the first mobile station 20 no longer needs the designated channel. The serving BTS 30 returns a UA message 480 acknowledging the receipt of the disconnect message 470. In a conventional manner, the serving BTS 30 also informs the connected BSC 40 of the received disconnect message 470 via Rel Ind message 530. After the T1 timer 630 associated with the serving BSC 40 expires, the serving BSC 40 transmits a RF Channel Release message 700 to the connected BTS 30. The transmitted RF Channel Release message 530 informs the connected BTS that the indicated logical channel, such as a SDCCH or TCH, is released and now available to others. Thereafter, the second mobile station 25 requests a logical channel, such as a SDCCH for an outgoing call setup, by transmitting a Channel Request message 300 towards the serving BTS 30. The serving BTS 30 then communicates with the connected BSC 40 and is allocated the same logical channel that was just released from the first mobile station 20. As a result, an Immediate Assignment message 350 is returned to the second mobile station 25 instructing the second mobile station to start transmitting over the newly allocated logical channel (i.e., SDCCH or TCH).

In the mean time, the UA message 480 acknowledging the receipt of the disconnect message 470 fails to reach the first mobile station 20, and in response, the first mobile station 20 re-attempts to release the same logical channel by transmitting a second Disconnect signal 490 towards the serving BTS 30. If the T1 timer has not yet expired, then the serving BTS 30 has not yet received the RF Channel Release message and the subsequently received Disconnect message is handled in a conventional manner. On the other hand, if the T1 timer has already expired, the serving BTS 30 has already received the RF Channel Release message 700 and has further released the indicated logical channel as fully described above. Therefore, by transmitting a Layer 2 Disconnect message over the same logical channel currently being occupied by the second mobile station, a signaling collision occurs on the single physical time-slot. As described in FIG. 5, acknowledging this Disconnect message results in also releasing the second mobile station and its associated call connection.

However, in accordance with the GSM standard, mobile stations are not allowed to transmit Layer 2 Disconnect message without first communicating a Layer 3 message with the serving BTS. Therefore, by determining that no Layer 3 message to release the associated channel has been communicated between the serving BTS 30 and the second mobile station 25, in accordance with the teachings of the present invention, the serving BTS ignores the second Disconnect message 490 received from the first mobile station 20. Thereafter, a Layer 3 SABM message 600 requesting mobile service (e.g., outgoing call connection) is transmitted from the second mobile station 25 to the serving BTS. An acknowledging UA message 610 is then returned to the second mobile station 25. A service request message 620 is also transmitted to the connected BSC 40 to provide the requested mobile service to the second mobile station 25.

In order to maximize the utilization of SDCCH and/or TCH logical channels within the serving BSC, the T1 timer 630 can be set to 0 ms. Accordingly, after receiving the first Disconnect message from the first mobile station, for example, the serving BSC 40 immediately releases the indicated channel without any delay. If the acknowledgment UA message fails to reach the first mobile station, four additional Disconnect messages will be transmitted by the first mobile station and ignored by the serving BTS 30. Instead, if the T1 timer 630 is set to 235 ms, it will allow the serving BTS 30 to acknowledge one additional Disconnect message in case the first UA message fails to reach the first mobile station 20. Thus, only three additional Disconnect messages may then be ignored by the serving BTS 30. As another illustration, the T1 timer 630 can be set to 940 ms. After receiving the first Disconnect message, the serving BTS 30 does not release the channel immediately but allows three additional Disconnect messages to be received and processed in a conventional manner in case all corresponding UA messages fail to reach the first mobile station 20. Only the fifth Disconnect message will be ignored by the serving BTS 30. The value assigned to the T1 timer 230 is decided upon by the BSC operator to provide effective channel release procedure while providing efficient channel resource management for the mobile telecommunications network.

Accordingly, by ignoring any subsequent Disconnect message received over the released and re-allocated logical channel, the serving BTS and BSC can more efficiently manage and utilize valuable channel resources.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for optimizing the utilization of a logical channel within a digital mobile telecommunications network which includes a base transceiver station BTS and a base station controller BSC for communicating with a first mobile station over said logical channel and said BSC further includes a disconnect timer with a value of T1 for delaying the release of said logical channel after receiving from said first mobile station an indication to release said logical channel, said T1 value corresponding to a time period during which said first mobile station will repeatedly retransmit said indication until either an acknowledgment of said indication is received at said first mobile station or said T1 value expires, said method comprising the steps of:

setting said disconnect timer with a value of T2 wherein said T2 value is less than and expires before said T1 value;

said BTS receiving from said first mobile station a first indication to release said logical channel currently associated with said first mobile station;

starting a countdown at said BSC of said disconnect timer in response to said first indication;

releasing said logical channel upon expiration of said T2 value of said disconnect timer and enabling other mobile stations to utilize said released logical channel; and in response to said releasing of said logical channel, said BTS ignoring any subsequent indication to release said logical channel.

2. The method of claim 1 wherein said logical channel comprises a Stand-alone Dedicated Control Channel SDCCH.

3. The method of claim 1 wherein said logical channel comprises a Traffic Channel TCH.

4. The method of claim 1 wherein said T1 value is 1175 ms, and wherein said T2 value is selected from a group of values each of which are less than said 1175 ms and different from one another by increments of 235 ms.

5. The method of claim 1 including transmitting an acknowledgment message acknowledging the receipt of said first indication.

6. The method of claim 5 wherein said mobile station transmits an additional indication to disconnect said logical channel if said acknowledgment message is not received from said BTS.

7. A method for optimizing the utilization of a logical channel within a digital mobile telecommunications network which includes a base transceiver station BTS and a base station controller BSC for communicating with a first mobile station over said logical channel and said BSC further includes a disconnect timer with a value of T1 for delaying the release of said logical channel after receiving from said first mobile station an indication to release said logical channel, said method comprising the steps of:

setting said disconnect timer with a value of T2 wherein said T2 value is less than said T1 value;

said BTS receiving from said first mobile station a first indication to release said logical channel currently associated with said first mobile station;

starting a countdown at said BSC of said disconnect timer in response to said first indication;

releasing said logical channel after the expiration of said T2 value of said disconnect timer and enabling other mobile stations to utilize said released logical channel;

in response to said releasing of said logical channel, said BTS ignoring any subsequent indication to release said logical channel; and wherein said first indication comprises a Global System for Mobile GSM communications based layer 2 Disconnect message.

8. A method for optimizing the utilization of a logical channel within a digital mobile telecommunications network which includes a base transceiver station BTS and a base station controller BSC for communicating with a first mobile station over said logical channel and said BSC further includes a disconnect timer with a value of T1 for delaying the release of said logical channel after receiving from said first mobile station an indication to release said logical channel, said method comprising the steps of:

setting said disconnect timer with a value of T2 wherein said T2 value is less than said T1 value;

said BTS receiving from said first mobile station a first indication to release said logical channel currently associated with said first mobile station;

starting a countdown at said BSC of said disconnect timer in response to said first indication;

releasing said logical channel after the expiration of said T2 value of said disconnect timer and enabling other mobile stations to utilize said released logical channel;

in response to said releasing of said logical channel, said BTS ignoring any subsequent indication to release said logical channel; and wherein said step of ignoring any subsequent indication to release said logical channel further comprises the step of ignoring said subsequent indication if no Layer 3 message has been first received over said logical channel.

9. A method for releasing a logical channel associated with a first mobile station within a mobile telecommunications network, said first mobile station being associated with a T1 timer for instructing said first mobile station to repeatedly transmit a request to release said logical channel until said T1 timer expires or until an acknowledgment message is received from a base transceiver station BTS serving said first mobile station, said BTS also being associated with a base station controller BSC with a T2 timer for use in releasing said logical channel, the value of said T2 timer being less than the value of said T1 timer so that said T2 timer expires before said T1 timer, said method comprising the steps of:

said BTS receiving from said first mobile station a request to release said logical channel;

informing said BSC of said request received by said BTS;

starting at said BSC a countdown of said T2 timer;

upon expiration of said T2 timer, said BSC instructing said BTS to release said logical channel, thereby enabling other mobile stations to utilize said released logical channel; and after release of said logical channel, said BTS ignoring a subsequent request to release said logical channel.

10. A method for releasing a logical channel associated with a first mobile station within a mobile telecommunications network, said first mobile station being associated with a T1 timer for instructing said first mobile station to repeatedly transmit a request to release said logical channel until said T1 timer expires or until an acknowledgment message is received from a base transceiver station BTS serving said first mobile station, said BTS also being associated with a base station controller BSC with a T2 timer for use in releasing said logical channel, the value of said T2 timer being less than the value of said T1 timer, said method comprising the steps of:

said BTS receiving from said first mobile station a request to release said logical channel;

informing said BSC of said request received by said BTS;

starting at said BSC a countdown of said T2 timer;

after expiration of said T2 timer, said BSC instructing said BTS to release said logical channel, thereby enabling other mobile stations to utilize said released logical channel;

said BTS ignoring a subsequent request to release said logical channel; and wherein said step of ignoring said subsequent request further comprises the step of ignoring said subsequent request to release said logical channel unless a Global System for Mobile GSM communications based layer 3 message has been first received over said logical channel.

11. The method of claim 10 wherein said layer 3 message comprises a Set Asynchronous Balanced Mode SABM message.

12. The method of claim 9 wherein said logical channel comprises a Traffic Channel TCH.

13. The method of claim 9 wherein said logical channel comprises a Stand-alone Dedicated Control Channel SDCCH.

14. A method for releasing a logical channel associated with a first mobile station within a mobile telecommunications network, said first mobile station being associated with a T1 timer for instructing said first mobile station to repeatedly transmit a request to release said logical channel until said T1 timer expires or until an acknowledgment message is received from a base transceiver station BTS serving said first mobile station, said BTS also being associated with a base station controller BSC with a T2 timer for use in releasing said logical channel, the value of said T2 timer being less than the value of said T1 timer, said method comprising the steps of:

said BTS receiving from said first mobile station a first request to release said logical channel;

informing said BSC of said request received by said BTS;

starting at said BSC a countdown of said T2 timer;

after expiration of said T2 timer, said BSC instructing said BTS to release said logical channel, thereby enabling other mobile stations to utilize said released logical channel;

said BTS ignoring a subsequent request to release said logical channel; and wherein said first request comprises a GSM based layer 2 Disconnect signal.

15. A system for releasing a logical channel allocated to a mobile station within a mobile telecommunications network, and wherein, in order to release said logical channel, said mobile station repeatedly transmits a request to release said logical channel for a time period having a duration of T1 if no acknowledgment signal is received from said mobile telecommunications network, comprising:

a receiver for receiving a request from said mobile station to release said logical channel;

a timer for waiting a duration period of T2 in response to a receipt of said request, wherein the value of said T2 period is less than the value of said T1 period associated with said mobile station so that said T2 period expires before said T1 period;

a first module associated with said timer for releasing said logical channel associated with said mobile station upon expiration of said T2 period of said timer; and a second module operable after release of said logical channel for ignoring any subsequent request to release said logical channel received by said receiver.

16. A system for releasing a logical channel allocated to a mobile station within a mobile telecommunications network, and wherein, in order to release said logical channel, said mobile station repeatedly transmits a request to release said logical channel for a time period having a duration of T1 if no acknowledgment signal is received from said mobile telecommunications network, comprising:

a receiver for receiving a request from said mobile station to release said logical channel;

a timer for waiting a duration period of T2 in response to a receipt of said request, wherein the value of said T2 period is less than the value of said T1 period associated with said mobile station;

a first module associated with said timer for releasing said logical channel associated with said mobile station after the expiration of said T2 period of said timer;

a second module operable after release of said logical channel for ignoring any subsequent request to release said logical channel received by said receiver; and wherein said second module further comprises means for ignoring said subsequent request to release said logical channel unless said receiver first receives a Global System for Mobile GSM communications based layer 3 message over said logical channel.

17. The system of claim 15 wherein said first and second modules are the same.

18. The system of claim 15 wherein said logical channel comprises a Traffic Channel TCH.

19. The system of claim 15 wherein said logical channel comprises a Stand-alone Dedicated Control Channel SDCCH.

20. A system for releasing a logical channel allocated to a mobile station within a mobile telecommunications network, and wherein, in order to release said logical channel, said mobile station repeatedly transmits a request to release said logical channel for a time period having a duration of T1 if no acknowledgment signal is received from said mobile telecommunications network, comprising:

a receiver for receiving a first request from said mobile station to release said logical channel;

a timer for waiting a duration period of T2 in response to a receipt of said request, wherein the value of said T2 period is less than the value of said T1 period associated with said mobile station;

a first module associated with said timer for releasing said logical channel associated with said mobile station after the expiration of said T2 period of said timer;

a second module operable after release of said logical channel for ignoring any subsequent request to release said logical channel received by said receiver; and wherein said first request comprises a Global System for Mobile GSM communications based layer 2 Disconnect signal.

21. The system of claim 15 wherein said receiver comprises a base transceiver station BTS serving said mobile station.

22. The system of claim 15 wherein said first module includes a base station controller BSC.

23. A system for optimizing the utilization of a logical channel within a digital mobile telecommunications network which includes a base transceiver station BTS and a base station controller BSC for communicating with a first mobile station over said logical channel and said BSC including a first disconnect timer with a value of T1 for delaying the release of said logical channel after receiving an indication to release said logical channel from said first mobile station, said first mobile station being associated with a second disconnect timer with a value of T2 for specifying a time period for repeatedly transmitting an indication to release said logical channel in case no acknowledgment is received from said BTS, said value of T1 being related to be less than said value of T2 so that said T1 value of said first disconnect timer expires before said T2 value of said second disconnect timer, comprising:

means for receiving at said BTS a first indication from said first mobile station to release said logical channel currently associated with said first mobile station;

means for releasing said logical channel upon expiration of said T1 value of said first disconnect timer following the receipt of said first indication and enabling other mobile stations to utilize said released logical channel; and means operable after release of said logical channel for ignoring any subsequent indication to release said logical channel.

24. The system of claim 23 wherein said logical channel comprises a Stand-alone Dedicated Control Channel SDCCH.

25. The system of claim 23 wherein said logical channel comprises a Traffic Channel TCH.

26. The system of claim 23 wherein said T2 value is 1175 ms, and wherein said T1 value is selected from a group of values each of which is less than said 1175 ms and different from one another by increments of 235 ms.

27. A system for optimizing the utilization of a logical channel within a digital mobile telecommunications network which includes a base transceiver station BTS and a base station controller BSC for communicating with a first mobile station over said logical channel and said BSC including a first disconnect timer with a value of T1 for delaying the release of said logical channel after receiving an indication to release said logical channel from said first mobile station, said first mobile station being associated with a second disconnect timer with a value of T2 for specifying a time period for repeatedly transmitting an indication to release said logical channel in case no acknowledgment is received from said BTS, said value of T1 being related to be less than said value of T2, comprising:

means for receiving at said BTS a first indication from said first mobile station to release said logical channel currently associated with said first mobile station;

means for releasing said logical channel after the expiration of said T1 value of said first disconnect timer following the receipt of said first indication and enabling other mobile stations to utilize said released logical channel;

means for ignoring any subsequent indication to release said logical channel; and wherein said means for ignoring any subsequent indication to release said logical channel further comprises means for ignoring any subsequent indication unless a layer 3 message is first received over said logical channel.

28. A method for releasing a logical channel allocated to a mobile station within a mobile telecommunications network, said method comprising the steps of:

receiving, at a base transceiver station BTS serving the mobile station, an indication to release a logical channel associated with the mobile station;

informing a base station controller BSC associated with said BTS of said received indication;

receiving at said BTS an instruction from said BSC to release said logical channel associated with said mobile station; and in response to release of said logical channel according to the instruction, ignoring at said BTS any subsequent indication to release said logical channel.

29. A method for releasing a logical channel allocated to a mobile station within a mobile telecommunications network, said method comprising the steps of:

receiving, at a base transceiver station BTS serving the mobile station, an indication to release a logical channel associated with the mobile station;

informing a base station controller BSC associated with said BTS of said received indication;

receiving at said BTS an instruction from said BSC to release said logical channel associated with said mobile station;

in response to the instruction, ignoring at said BTS any subsequent indication to release said logical channel; and wherein said step of ignoring said subsequent indication further comprises the step of ignoring said subsequent indication to release said logical channel unless a Global System for Mobile GSM communications based layer 3 message has been first received over said logical channel.

30. The method of claim 29 wherein said layer 3 message comprises a Set Asynchronous Balanced Mode (SABM) message.

31. The method of claim 1, wherein said ignoring step includes selectively ignoring any subsequent indication to release said logical channel.

32. The method of claim 1, wherein each said indication to release said logical channel lacks an identification of a source of said indication.

33. The method of claim 1, wherein said ignoring step includes ignoring any subsequent indication to release said logical channel until expiration of said T1 value of said disconnect timer.

34. The method of claim 9, wherein said ignoring step includes selectively ignoring a subsequent request to release said logical channel.

35. The method of claim 9, wherein each said request to release said logical channel lacks an identification of a source of said request.

36. The method of claim 9, wherein said ignoring step includes ignoring a subsequent request to release said logical channel until expiration of said T1 timer.

37. The system of claim 15, wherein said second module is operable after release of said logical channel to selectively ignore any subsequent request to release said logical channel.

38. The system of claim 15, wherein each said request to release said logical channel lacks an identification of a source of said request.

39. The system of claim 15, wherein said second module is operable after release of said logical channel to ignore any subsequent request to release said logical channel until expiration of said T1 period.

40. The system of claim 23, wherein said means for ignoring includes means operable after release of said logical channel for selectively ignoring any subsequent indication to release said logical channel.

41. The system of claim 23, wherein each said indication to release said logical channel lacks an identification of a source of said indication.

42. The system of claim 23, wherein said means for ignoring is operable after release of said logical channel to ignore any subsequent indication to release said logical channel until expiration of said T2 value of said second disconnect timer.

43. The method of claim 28, wherein said ignoring step includes selectively ignoring any subsequent indication to release said logical channel.

44. The method of claim 28, wherein each said indication to release said logical channel lacks an identification of a source of said indication.

* * * * *